United States Patent Office 3,574,734
Patented Apr. 13, 1971

3,574,734
HYDROGENATION OF UNSATURATED CARBOXYLIC ACIDS
Geoffrey Colin Bond, London, England, assignor to Johnson, Matthey & Co. Limited, London, England
No Drawing. Filed July 7, 1967, Ser. No. 651,711
Claims priority, application Great Britain, July 12, 1966, 31,310/66
Int. Cl. C07c 51/36, 55/10
U.S. Cl. 260—537  9 Claims

ABSTRACT OF THE DISCLOSURE

Unsaturated carboxylic acids are hydrogenated in the presence of a water-soluble amino compound of rhodium.

---

This invention is concerned with the provision of an improved process for the hydrogenation of water-soluble unsaturated compounds, and in particular carboxylic acids.

Our experiments have shown that certain new hydrido pentammine rhodium compounds such as the sulphate have properties that make them very suitable for use as hydrogenation catalysts.

According to a feature of the present invention we provide a process for the hydrogenation of water soluble unsaturated compounds which comprises mixing an ionic ammino-compound of rhodium as specified herein with an aqueous solution of a water soluble unsaturated compound, for example an unsaturated carboxylic acid, to produce a substantially homogeneous solution including the catalyst in which the hydrogenation is readily effected. The cations of the specified amino-compounds of rhodium have a hydrogen atom co-ordinated to the rhodium atom and have the general formula:

$$(HRhX_5)^{2+}$$

where $X_5$ is five ammonia groups $NH_3$ or four $NH_3$ groups and one aquo group $H_2O$. The anion may be a divalent or a monovalent acid radical. The invention therefore includes the use of the new rhodium compounds as homogeneous hydrogenation catalysts for the hydrogenation of water soluble unsaturated compounds.

An important aspect of the invention is that these rhodium compounds, of which hydrido-pentammine rhodium sulphate is an example, in contrast to any of the other precious metal compounds hitherto used as homogeneous hydrogenation catalysts, are soluble in water rather than or in addition to being soluble in organic solvents.

The water solubility of the compounds confers potential advantages in that (1) the solvent is cheaper, (2) it is safe. Further, unlike a ruthenium chloride catalyst solution no reducing agent is needed to render the compounds in solution catalytically active.

It will be understood that a compound reducible by hydrogen in the presence of one of the new catalysts must be substantially water soluble, for example an unsaturated carboxylic acid. It may be added that the active species in solution may not necessarily have the same formula as the solid viz $HRh(NH_3)_5SO_4$ but may be the derived aquotetra ammine.

The following is a brief account of some experiments we have carried out to determine the catalytic activity of one of the compounds. The compound concerned was hydridopentammine rhodium sulphate which is a yellowish-white powder soluble in water and of which a 0.04 M solution can be prepared by dissolving 0.057 gm. in 5 ml. of water at room temperature. It was noted that the solution darkened on standing or shaking and a fresh solution was made up for each run. The compound was found to be insoluble in organic solvents such as methanol, ethanol, acetone and pentene.

Unsaturated acids such as maleic and crotonic w./v. and acrylic v./v. were used in our experiments as 8% aqueous solutions. The order of injection used was as follows:

(1) solvent (if any)
(2) unsaturated compound (e.g. the acid) or its solution
(3) catalyst solution.

After initial relatively unsuccessful runs at room temperature subsequent runs were performed with the flask shaken in a water bath at 60° C. from which it became apparent that moderate warming is desirable in order to effect satisfactory hydrogenation.

As a result of our experiments we have established that aqueous solutions of the rhodium compound will catalyse the hydrogenation of unsaturated acids at 60° but no hydrogenation of maleic acid occurred at 19° C. The results are given in the table below. We found that after some initial irregularity the rate became zero order, unless reduced metal was formed, whereupon acceleration occurred. Rates are quite reproducible (compare runs 87 and 88) and are not much affected by catalyst concentration (compare 83 and 87). The effect of acid concentration was not examined. The sequence of reactivities is acrylic>crotonic>maleic but a different concentration was used in each case. Interesting colour changes were observed during these reactions: with maleic acid, solutions turned a deeper yellow: with crotonic acid, the solution turned dark green before the reduced metal was formed: and with acrylic acid, it turned a yellowish-green. On shaking the aqueous solution of the compound (0.022 M) under $H_2$ at 60° C. for 1 hour, metallic rhodium in the form of tightly curled platelets was seen to have been formed. 4.8 ml. of $H_2$ was taken up (1.2 ml. of $H_2$ at STP are required to replace one $NH_3$ group by H).

HYDROGENATION OF UNSATURATED ACIDS USING AQUEOUS SOLUTIONS OF $(HRh(NH_3)_5)SO_4$ AT 60° C.

| Run | Catalyst conc., M | Acid | Acid conc., M | Theoretical $H_2$ uptake, ml., STP | Rate, ml. hr.$^{-1}$ | Time for rate to become zero order, min. |
|---|---|---|---|---|---|---|
| 83 | 0.02 | Maleic | 0.34 | 41.4 | 6.7 | 25–60 |
| 87 | 0.05 | ---do--- | 0.34 | 41.4 | 7.8 | 30 |
| 88 | 0.05 | ---do--- | 0.34 | 41.4 | 8.0 | 25 |
| 89 | 0.05 | Crotonic | 0.46 | 55.8 | 9.2 | 5–65 |
| 90 | 0.05 | Acrylic | 0.59 | 66.0 | 17.2 | 25 |

To sum up we believe that the important part of the compound for our purposes is the cation:

$$(HRh(NH_3)_5)^{2+}$$

the anion may be the sulphate radical $(SO_4)^{2-}$ or some other suitable radical e.g. acetate, nitrate, chloride and so on, so that the formula may be expressed as:

$$(HRh(NH_3)_5)X$$

where X represents one or two suitable radicals.
What I claim is:
1. A process for the hydrogenation of water-soluble unsaturated lower aliphatic hydrocarbon carboxylic acids which comprises mixing an aqueous solution of the unsaturated acid with a catalyst in the form of an ionic water-soluble ammino compound of rhodium, the cation of which has a hydrogen atom co-ordinated to the rhodium atom and which has a formula selected from the group consisting of $(HRh(NH_3)_5)^{2+}$ and $$(HRh(NH_3)_4H_2O)^{2+}$$

and the anion of which is an acid radical selected from the group consisting of acetate, chloride, sulfate and nitrate, whereby a substantially homogeneous solution is produced, including the catalyst, in which hydrogenation is readily effected, and thereafter contacting the homogeneous solution with hydrogen to effect hydrogenation of the unsaturated compound.

2. A process according to claim 1 wherein the water soluble unsaturated acid is maleic acid.

3. A process according to claim 1 wherein the anion of the ionic catalyst is a sulfate radical.

4. A process according to claim 1 wherein the acid radical is monovalent.

5. A process according to claim 1, wherein the catalyst is hydridopentammino rhodium sulphate.

6. A process according to claim 1 including the step of warming the solution to about 60° C. prior to completion of the hydrogenation step.

7. A process according to claim 5 wherein the ammino compound of rhodium is converted in solution to the derived aquotetra ammine.

8. A process for the hydrogenation of water-soluble unsaturated lower aliphatic hydrocarbon carboxylic acids, which process comprises forming an aqueous solution of the carboxylic acid, thereafter forming an aqueous solution of the carboxylic acid solution with a catalyst in the form of an ionic water-soluble ammino compound of rhodium, the cation of which has a hydrogen atom co-ordinated to the rhodium atom and which has a formula selected from the group consisting of $(HRh(NH_3)_5)^{2+}$ and $(HRh(NH_3)_4H_2O)^{2+}$ and the anion of which is an acid radical selected from the group consisting of acetate, chloride, sulphate and nitrate, whereby a substantially homogeneous solution is produced, including the catalyst, in which hydrogenation is readily effected, and thereafter contacting the homogeneous solution with hydrogen to effect hydrogenation of the unsaturated compound.

9. A process for the hydrogenation of water-soluble unsaturated compounds selected from the group consisting of maleic, acrylic and crotonic acids, which process comprises mixing an aqueous solution of the unsaturated compound with a catalyst in the form of an ionic water-soluble ammino compound of rhodium, the cation of which has a hydrogen atom co-ordinated to the rhodium ion and which has a formula selected from the group consisting of $(HRh(NH_3)_5)^{2+}$ and $(HRh(NH_3)_4H_2O)^{2+}$, and the anion selected from the group consisting of acetate, chloride, sulfate and nitrate, whereby a substantially homogeneous solution is produced, and thereafter contacting the homogeneous solution with hydrogen to effect hydrogenation of the unsaturated compound.

References Cited

UNITED STATES PATENTS 3,185,727  5/1965  Kwiatek et al. _____ 260—540

OTHER REFERENCES

Chem. Abstracts, 34:1931² (1940).

LORRAINE A. WEINBERGER, Primary Examiner

V. GARNER, Assistant Examiner

U.S. Cl. X.R.

252—431, 438; 260—540